Patented Apr. 26, 1938

2,115,681

UNITED STATES PATENT OFFICE 2,115,681

DIALKYL SUBSTITUTED AMIDES OF ISOXAZOLE CARBOXYLIC ACIDS

Max Hoffer, Basel, Switzerland, assignor to Hoffmann-La Roche Inc., Nutley, N. J., a corporation of New Jersey No Drawing. Application February 4, 1936, Serial No. 62,381. In Germany February 22, 1935

6 Claims. (Cl. 260—44)

Representatives of the isoxazole series having a practical value were heretofore unknown (Meyer-Jacobson, Lehrbuch der organischen Chemie, vol. II, 3rd part, page 507, last paragraph). It has now been found that the dialkyl substituted amides of isoxazole carboxylic acids possess therapeutically valuable properties, such as, stimulating circulation when orally or parenterally administered. For obtaining these amides, compounds of the general formula:

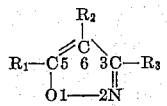

in which one of the radicles $R_1$, $R_2$, $R_3$ represents a carboxyl group, the others alkyl radicles or hydrogen, are transformed into reactive acid derivatives, for instance into the so far unknown acid chlorides, and these caused to react with secondary amines.

The new isoxazole carboxylic acid dialkylamides are compounds soluble in water, alcohol, ether, chloroform, benzene. They are to be used as medicines.

Example 1

140 parts by weight of 3,5-dimethyl-isoxazole-4-carboxylic acid (Annalen der Chemie, vol. 277, 1893, page 174) are boiled with 400 parts by weight of thionyl chloride for 1½ hours under reflux. The excess of thionyl chloride is distilled off on the steam-bath and the residue distilled in vacuo. The dimethyl-isoxazole-carboxylic acid chloride is a colourless oil which boils at 90° C. under a pressure of 12 mm.

158 parts by weight of 3,5-dimethyl-isoxazole-4-carboxylic acid chloride are diluted with 300 parts by weight of ether; while stirring and thoroughly cooling 75 parts by weight of diethylamine are slowly added. To the reaction product which, owing to the precipitation of diethylamine hydrochloride is transformed into a pulp, 200 parts by weight of a 20% solution of sodium hydroxide are slowly added while thoroughly stirring and cooling, whereby the reaction between the diethylamine and the acid chloride is completed. Finally the same quantity by volume of a 20% solution of sodium hydroxide is added and the aqueous layer is removed. After drying with solid potassium hydroxide and removing the ether by distillation the diethylamide of 3,5-dimethyl-isoxazole-4-carboxylic acid is obtained which has the formula:

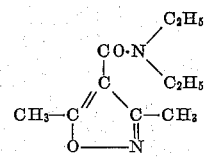

For purification the product is distilled in vacuo. The compound is an almost colourless oil boiling at 155–156° C. under a pressure of 11 mm. It is miscible in all proportions with water, alcohol, ether, chloroform, benzene, but difficultly soluble in petroleum ether.

Example 2

158 parts by weight of 3,5-dimethyl-isoxazole-4-carboxylic acid chloride are heated with 80 parts by weight of dimethylamine hydrochloride in an oil-bath to 130–140° C. until the evolution of hydrochloric acid ceases. After cooling the product is dissolved in a little water and the dimethylamide of 3,5-dimethyl-isoxazole-4-carboxylic acid precipitated by the addition of a 30% solution of potassium hydroxide. The product is taken up with ether, dried with solid potassium hydroxide and purified by distilling in vacuo. The compound forms colourless prisms melting at 55° C.; it is easily soluble in water, alcohol, ether, chloroform and benzene, difficultly soluble in petroleum ether. This compound has the formula:

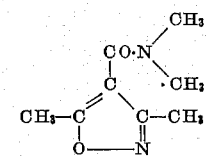

Example 3

127 parts by weight of 5-methyl-isoxazole-3-carboxylic acid (Berichte der Deutschen Chemischen Gesellschaft, vol. 42, 1909, page 60) are mixed with 207 parts by weight of phosphorus pentachloride. The mixture quickly liquefies with vigorous evolution of hydrogen chloride. After warming for half an hour on the water-bath under reflux the conversion will be completed. By fractionally distilling in vacuo the 5-methyl-isoxazole-3-carboxylic acid chloride is obtained in pure form. It is a colourless oil which distils under a pressure of 14 mm. at 82–84° C. On cooling to 0° C. it sets to an aggregate of colourless needles melting at 25° C.

144 parts by weight of 5-methyl-isoxazole-3-carboxylic acid chloride are caused to react with 75 parts by weight of diethylamine in the manner described in Example 1. The diethylamide of 5-methyl-isoxazole-3-carboxylic acid thus obtained boils under a pressure of 13 mm. at 146–148° C. and forms a colourless oil, which dissolves at room temperature in about the 20-fold quantity of water. In alcohol, ether, benzene or chloroform the compound is easily soluble. This compound has the formula:

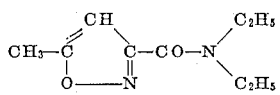

Example 4

144 parts by weight of 5-methyl-isoxazole-3-carboxylic acid chloride are reacted with 80 parts by weight of dimethylamine hydrochloride in the manner described in Example 2. The dimethylamide of 5-methyl-isoxazole-3-carboxylic acid is a light-coloured oil boiling at 142–143° C. It is miscible in all proportions with water, alcohol, ether, chloroform and benzene. This compound has the formula:

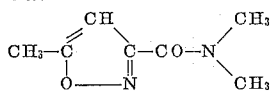

Example 5

The heretofore unknown 3- or 5-methyl-isoxazole-4-carboxylic acid is obtained by treating ethoxymethylene acetic acid ester with hydroxylamine. The ester is saponified by boiling with dilute mineral acid. The 3- or 5-methyl-isoxazole-carboxylic acid crystallizes from water in colourless prisms melting at 143–144° C. From the method of formation it is not possible to decide with absolute certainty which of the two possible constitutions, that of the 3- or that of the 5-methyl-isoxazole-4-carboxylic acid, pertains to the acid obtained.

127 parts by weight of 3- or 5-methyl-isoxazole-4-carboxylic acid are converted into the chloride in the manner described in Example 3 by means of 207 parts by weight of phosphorous pentachloride. The 3- or 5-methyl-isoxazole-carboxylic acid chloride is a colourless oil boiling under a pressure of 13 mm. at 83–84° C.

144 parts by weight of the chloride are reacted with 85 parts by weight of diethylamine as described in Example 1. The diethylamide of methyl-isoxazole-4-carboxylic acid is a light-coloured oil boiling at 146–148° C. under a pressure of 12 mm. It is rather difficultly soluble in water, easily soluble in ether, chloroform and benzene. This compound has the formula:

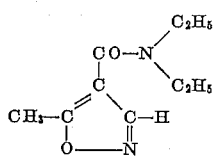

Example 6

158 parts by weight of 3,5-dimethyl-isoxazole-4-carboxylic acid chloride are diluted with the same quantity of ether. While stirring and cooling 97 parts by weight of diallylamine in 100 parts by weight of ether are dropped in. When all the acid chloride has been added, 200 parts by weight of a 20% solution of sodium hydroxide are allowed to flow in while stirring and cooling. The precipitated diallylamine hydrochloride is thus dissolved and completely converted. Then the ether layer is removed and the product dried with anhydrous potassium carbonate. When the ether has been removed by distillation the 3,5-dimethyl-isoxazole-4-carboxylic acid diallylamide remains and may be purified by distilling in vacuo. The compound is a light-yellow oil which boils at 166–167° C. under a pressure of 13 mm. It is miscible with alcohol, ether, benzene, chloroform, insoluble in petroleum ether. In water it is difficultly soluble at room temperature. This compound has the formula:

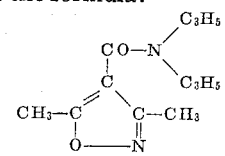

Example 7

156 parts by weight of diethylamino-ethylallylamine are dissolved in 200 parts by weight of benzene and 500 parts by weight of a 10% solution of sodium hydroxide are added. 158 parts by weight of 3,5-dimethyl-isoxazole-4-carboxylic acid chloride are dropped in while thoroughly stirring and cooling. The benzene layer is dried with potassium carbonate, the benzene evaporated and the residue distilled in vacuo. The 3,5-dimethyl-isoxazole-4-carboxylic acid diethylamino-ethylallylamide boils at 200–202° C. under a pressure of 13 mm. It is easily soluble in organic solvents with the exception of petroleum ether. In water it dissolves at room temperature to the extent of about 8%. This compound has the formula:

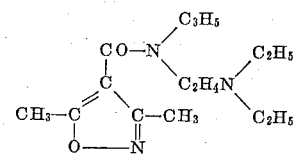

In the same manner may be obtained the 3,5-dimethyl-isoxazole-4-carboxylic acid di-n-propylamide, a light-yellow, rather difficultly water-soluble oil melting at 168–170° C. under 13 mm. pressure, and the 3,5-dimethyl-isoxazole-4-carboxylic acid di-n-butylamide, a difficultly water-soluble yellow oil boiling at 182–184° C. under 13 mm. pressure.

I claim:

1. As a new analeptic, a compound of the general formula

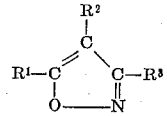

wherein one of the radicals $R^1$, $R^2$ and $R^3$ represents the group

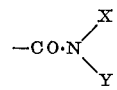

wherein X represents a lower aliphatic radical and Y is a radical selected from the group consisting of lower alkyl and lower dialkyl amino lower alkyl radicals, the remaining R radicals being selected from the group consisting of hydrogen and alkyl radicals, said compound being soluble in water and suitable for oral and parenteral administration.

2. As a new analeptic, a compound of the general formula

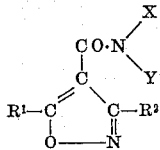

wherein $R^1$ and $R^2$ are selected from the group consisting of hydrogen and alkyl radicals, X represents a lower aliphatic radical and Y is a radical selected from the group consisting of lower alkyl and lower dialkyl amino lower alkyl radicals, said compound being soluble in water and suitable for oral and parenteral administration.

3. As a new analeptic, the compound 3,5-dimethyl-isoxazole-4-carboxylic acid diethylamide having the structure

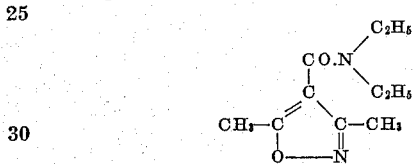

which is soluble in water and suitable for oral and parenteral administration.

4. As a new analeptic, the compound 3,5-dimethyl-isoxazole-4-diethylaminoethylallylamide having the structure

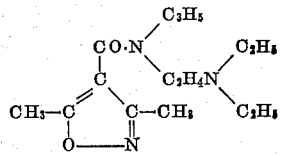

which is soluble in water and suitable for oral and parenteral administration.

5. As a new analeptic a compound of the general formula

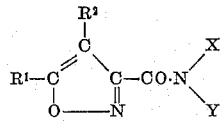

wherein $R^1$ and $R^2$ are selected from the group consisting of hydrogen and alkyl radicals, X represents a lower aliphatic radical and Y is a radical selected from the group consisting of lower alkyl and lower dialkyl amino lower alkyl radicals, said compound being soluble in water and suitable for oral and parenteral administration.

6. As a new analeptic the compound 5-methyl-isoxazole-3-carboxylic acid diethylamide having the formula

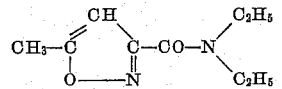

which is soluble in water and suitable for oral and parenteral administration.

MAX HOFFER.